United States Patent
Border et al.

(10) Patent No.: US 7,616,393 B2
(45) Date of Patent: Nov. 10, 2009

(54) COMPACT FOLDED THIN LENS

(75) Inventors: John N. Border, Walworth, NY (US);
Joseph R. Bietry, Rochester, NY (US);
John T. Compton, LeRoy, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 11/961,038

(22) Filed: Dec. 20, 2007

(65) Prior Publication Data

US 2009/0161235 A1   Jun. 25, 2009

(51) Int. Cl.
G02B 5/04    (2006.01)
(52) U.S. Cl. .................................... 359/834; 359/837
(58) Field of Classification Search ............. 359/834, 359/837, 731, 730; 348/335
See application file for complete search history.

(56) References Cited

U.S. PATENT DOCUMENTS

| | | | |
|---|---|---|---|
| 4,941,731 A | 7/1990 | Macken | |
| 6,278,553 B1 | 8/2001 | Akiyama | |
| 6,795,253 B2 | 9/2004 | Shinohara | |
| 6,842,295 B2 | 1/2005 | Yamakawa | |
| 6,898,023 B2 | 5/2005 | Takeuchi | |
| 6,900,950 B2 | 5/2005 | Nagata | |
| 6,961,191 B2 | 11/2005 | Sato | |
| 7,221,522 B2 * | 5/2007 | Tesar et al. | 359/740 |
| 2003/0076436 A1 | 4/2003 | Otake et al. | |
| 2005/0002073 A1 * | 1/2005 | Nakamura et al. | 359/15 |
| 2006/0092524 A1 | 5/2006 | Konno | |
| 2006/0279821 A1 * | 12/2006 | Riley et al. | 359/15 |
| 2008/0291531 A1 | 11/2008 | Heimer | |

* cited by examiner

Primary Examiner—Timothy J Thompson
(74) Attorney, Agent, or Firm—Nelson A. Blish

(57) ABSTRACT

A thin lens consists of a first optical element which comprises a first refracting surface, wherein incoming light passes through the first refracting surface on a first optical axis. A reflecting surface changes a direction of the incoming light from the first optical axis to a second optical axis. Incoming light on the second optical axis passes through a second refracting surface. A second optical element comprises a first refracting surface, wherein incoming light passes through the first refracting surface on the second optical axis. A reflecting surface changes a direction of the incoming light from the second optical axis to a third optical axis. Incoming light on the third optical axis passes through a second refracting surface. The third optical axis is approximately parallel to, and in opposite direction from, the first optical axis.

8 Claims, 15 Drawing Sheets

COMPACT FOLDED THIN LENS

FIELD OF THE INVENTION

The invention pertains to a compact, thin lens for portable devices including an image capture device.

BACKGROUND OF THE INVENTION

For portable devices such as cellular phone cameras and laptop computer cameras, it is desirable to reduce costs as much as possible and to keep the thickness of the portable device as thin as possible. Folding the optical path of a lens is an excellent way to change the form factor of the optical assembly. Consequently, a folded optical assembly is an attractive alternative for the image capture device in a portable apparatus. It is the goal of the present invention to provide a low cost folded optical assembly for an image capture device wherein the thickness of the optical assembly is less than 7 mm.

Examples of folded optical assemblies can be found in U.S. Pat. Nos. 6,898,023 (Takeuchi), 6,900,950 (Nagata), and U.S. Patent Application Publication No. 2006/0092524 (Konno). Takeuchi discloses a zoom lens assembly with a series of refractive elements and a prism to fold the optical path. Takeuchi's folded zoom lens assembly is over 7 mm in thickness and it would be relatively expensive since it is composed of five lenses, one prism, and one filter. In addition, the third lens group moves as the lens zooms so guidance is required on this lens group. As a result, the zoom lens assembly described by Takeuchi is relatively thick and relatively expensive.

Nagata discloses a folded lens assembly, shown in FIG. 1, that is composed of a series of two refractive surfaces (100 and 160) and three reflective surfaces (110, 140, and 150) to create an optical path with three folds. Refractive surfaces 120 and 130 are typically parallel surfaces and as such do not have optical power but they could have refractive functionality. Element 170 is a cover glass and infrared filter which does not have optical power. A problem with the design described by Nagata is that multiple free form surfaces are used. The free form surfaces are required to generate optical power from the three curved reflective surfaces (110, 140, and 150) used in the Nagata lens design to focus the image on the sensor 180. Free form surfaces are not rotationally symmetric and as such the mold components for molding the lenses are not manufacturable with rotationally based tooling processes such as diamond turning or traditional grinding and polishing so that manufacturing costs are substantially increased.

Konno discloses a folded zoom lens assembly, shown in FIG. 2, that includes a series of five refractive lenses (230, 240, 250, 255 and 260) and two prism elements (210 and 270) to fold the optical path as and focus an image on the sensor 285. Element 275 is a cover glass and infrared filter which does not have optical power. This folded zoom lens assembly would also be relatively expensive since the embodiments described include glass lens elements and prisms. In addition, the lens elements between the two prisms are movable to provide the zoom function which requires complicated guidance mechanisms.

Therefore a need persists for a low cost folded optical assembly for an image capture device wherein the thickness dimension of the optical assembly is thin.

SUMMARY OF THE INVENTION

Briefly, according to one aspect of the present invention a thin lens consists of a first optical element which comprises a first refracting surface, wherein incoming light passes through the first refracting surface on a first optical axis. A reflecting surface changes a direction of the incoming light from the first optical axis to a second optical axis. Incoming light on the second optical axis passes through a second refracting surface. A second optical element comprises a first refracting surface, wherein incoming light passes through the first refracting surface on the second optical axis. A reflecting surface changes a direction of the incoming light from the second optical axis to a third optical axis. Incoming light on the third optical axis passes through a second refracting surface. The third optical axis is approximately parallel to, and in opposite direction from, the first optical axis.

The invention describes a low cost folded optical assembly for an image capture device that has a thickness that is less then 7 mm. The low cost folded optical assembly includes two plastic prisms with optical power to provide good optical performance in a very thin form factor at a low cost.

These and other objects, features, and advantages of the present invention will become apparent to those skilled in the art upon a reading of the following detailed description when taken in conjunction with the drawings wherein there is shown and described an illustrative embodiment of the invention.

DETAILED DESCRIPTION OF THE INVENTION

The present description is directed in particular to elements forming part of, or cooperating more directly with, apparatus in accordance with the invention. It is to be understood that elements not specifically shown or described may take various forms well known to those skilled in the art.

For portable devices with image capture devices such as cellular phones, laptop computers, and personal digital assistants, compact size is required for portability. In particular, thinness is desirable both to reduce size and increase portability, and also to improve the perceived style and improve the heat transfer from the device thereby improving reliability by reducing the operating temperature.

Folded lens designs provide an excellent method to reduce the length of an optical assembly. The challenge is to deliver high modulation transfer function values out to the Nyquist frequency with a small number of plastic elements that have rotationally symmetric surfaces to keep manufacturing costs low.

The invention is based on lens designs with two plastic elements that are mated together to align the elements with each other. A planar reflective surface is used in each element to turn the optical path by approximately 90 degrees in each element. As such, the planar reflective surfaces do not impart any optical power. The optical power is then delivered by the two refractive surfaces in each element. By confining the optical power to the refractive surfaces and using a planar reflective surface to turn the optical power by 90 degrees in each element, the light rays pass through the refractive surfaces symmetrically so that rotationally symmetric surfaces can be used throughout the lens design. The use of rotationally symmetric surfaces substantially reduces the manufacturing cost of the tooling to make the lens elements. In addition, the first element has positive optical power to reduce the lateral size of the light bundle and the second element has negative optical power to aid in color correction.

In addition, the lens elements are laid out so that the image sensor plane is parallel to the lens aperture of the first lens surface, which receives the incoming light. The advantage of this orientation of the image sensor is that the long dimensions of the image sensor are placed in the lateral dimension of the image capture device so that the image sensor does not add substantially to the thickness of the image capture device.

Figure 1:
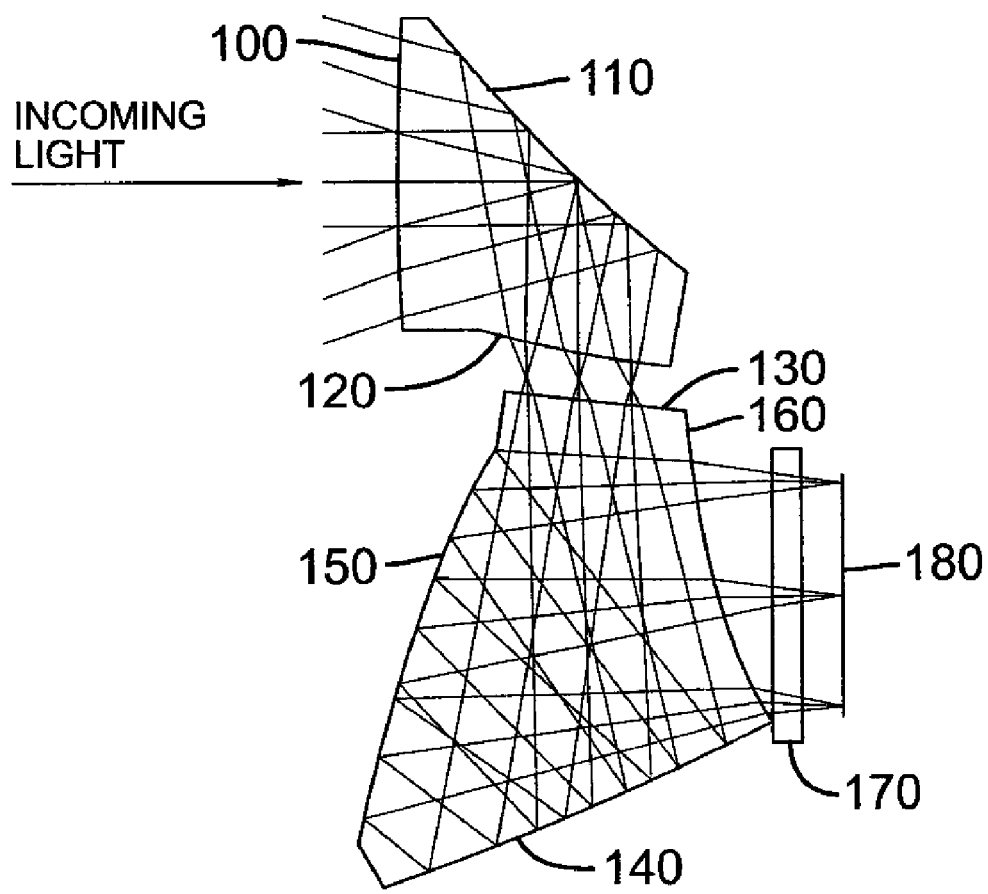
FIG. 1 is a ray trace schematic of a prior art folded lens.
Figure 2:
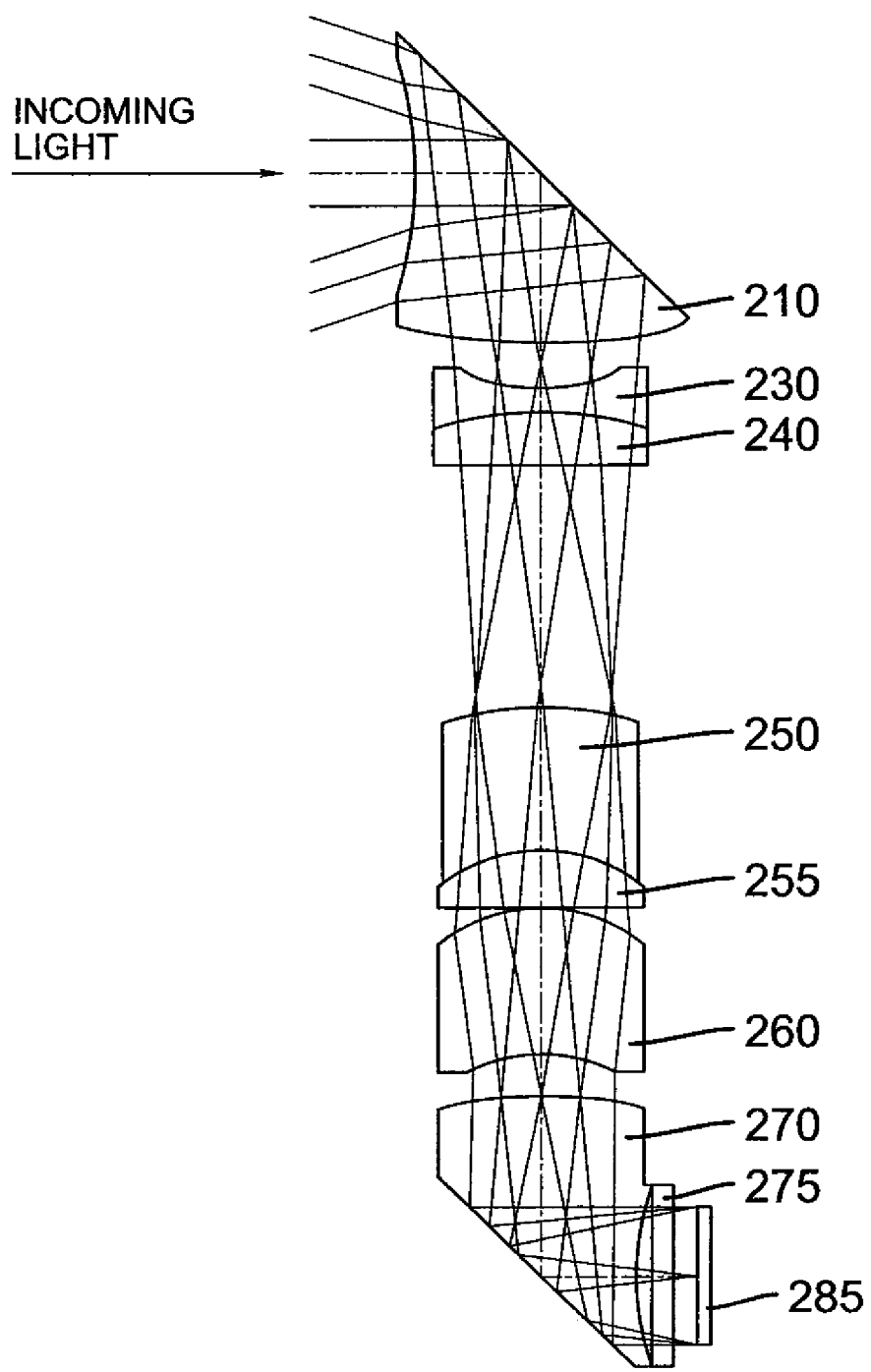
FIG. 2 is a ray trace schematic of another prior art folded lens.
Figure 3:
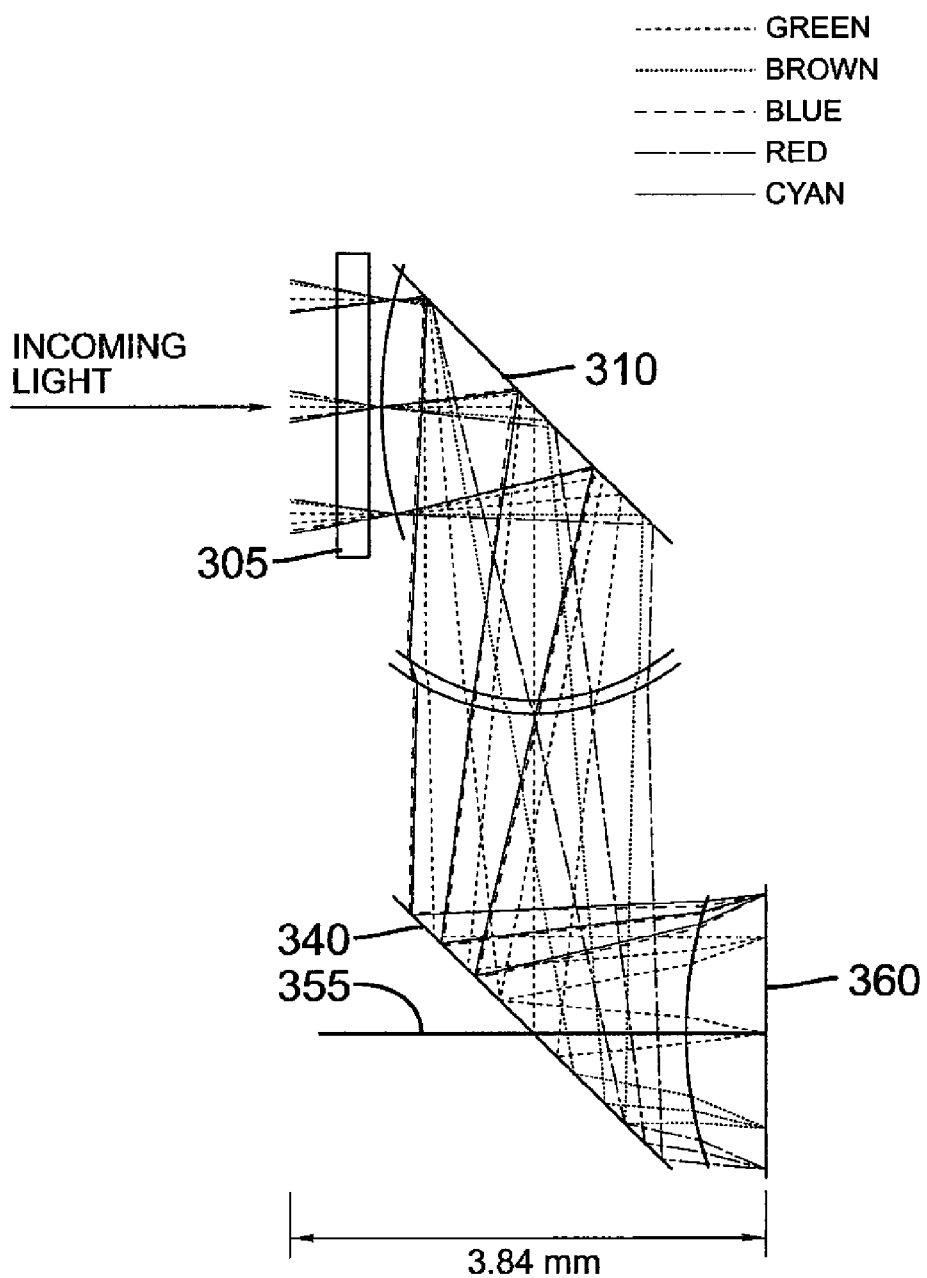
FIG. 3 is a ray trace schematic of a moderate angle field of view lens (62 mm equivalent focal length (EFL) for a 35 mm sensor) in a Z-shaped layout.

FIG. 3 shows a two element folded lens design with a Z-shaped layout wherein the incoming light is parallel to the optical axis 355 of the light at the image sensor 360 and the direction of the incoming light is the same as the direction of the light at the image sensor 360. In the Z-shaped layout, the image sensor 360 is located on the back side of the image capture device on the opposite side from the lens aperture which receives the incoming light, with the image sensor 360 facing the front.

Within the scope of the invention, a new lens layout is proposed in the shape of a U (see FIG. 4) wherein the incoming light is parallel to the optical axis 455 of the light at the image sensor 460 but the direction of the incoming light is opposite to the direction of the light at the image sensor 460. In the U-shaped layout, the image sensor 460 is located on the front side of the image capture device, on the same side if the device as the lens aperture that receives the incoming light, with the image sensor 460 facing the back of the camera or device.

Figure 4:
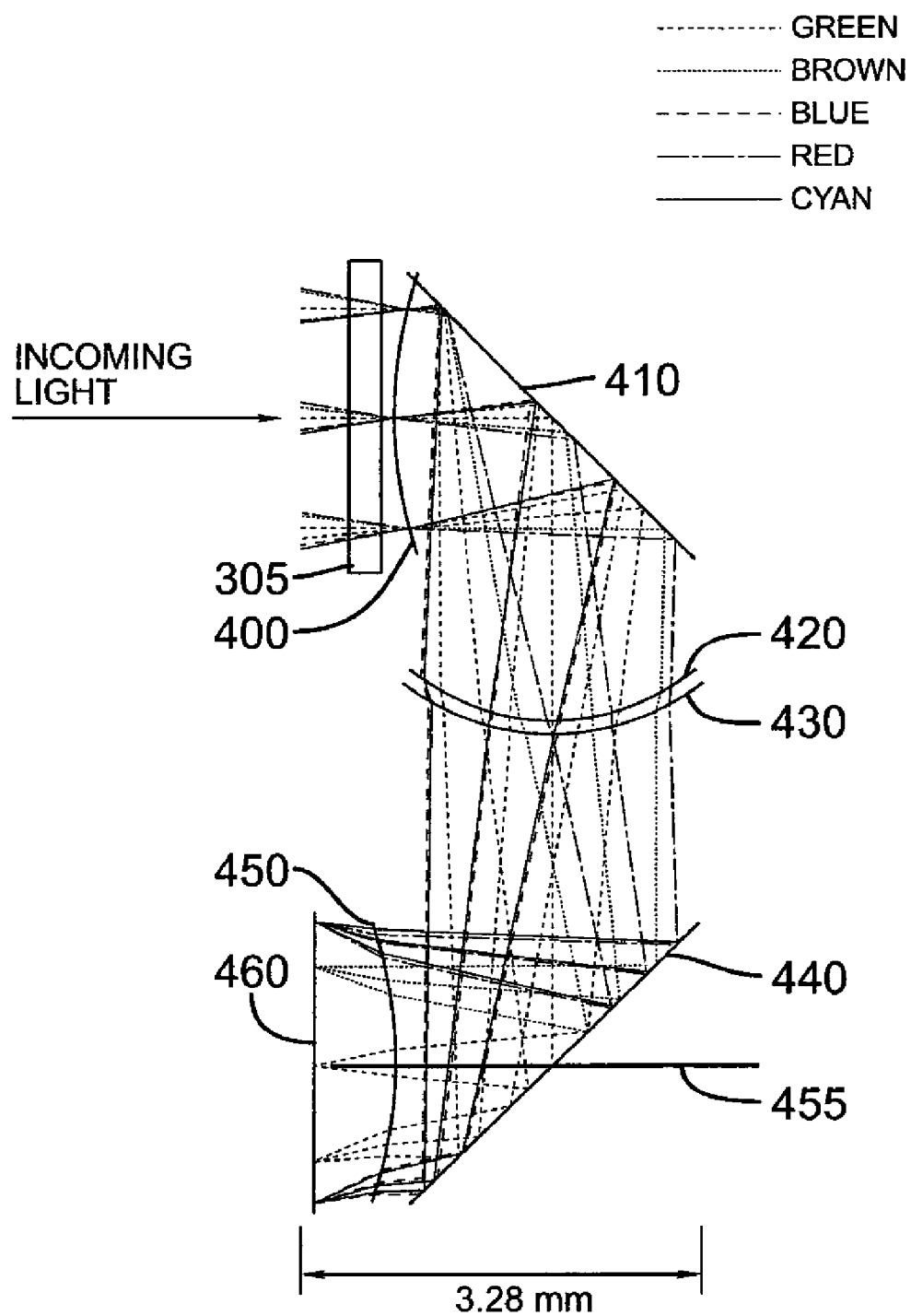
FIG. 4 is a ray trace schematic of a moderate angle field of view lens (62 mm EFL) in a U-shaped layout.

By arranging the optical path in a U-shaped layout, the thickness of the lens assembly is reduced compared to a Z-shaped layout because the two horizontal portions of the optical path do not both add to the thickness dimension. As can be seen in FIG. 3, in a Z-shaped layout, the horizontal portion of the optical path from the cover glass 305 to the first reflective surface 310 and the horizontal portion of the optical path from the second reflective surface 340 to the image sensor 360 both add to the thickness dimension of the lens assembly. In contrast, as can be seen in FIG. 4, in a U-shaped layout the horizontal portion of the optical path from the cover glass 305 to the first reflective surface 410 and the horizontal portion of the optical path from the second reflective surface 440 to the image sensor 460 do not both add to the thickness dimension since the optical path folds back on itself. Consequently, the U-shaped layout is always thinner than the Z-shaped layout.

Figure 5:
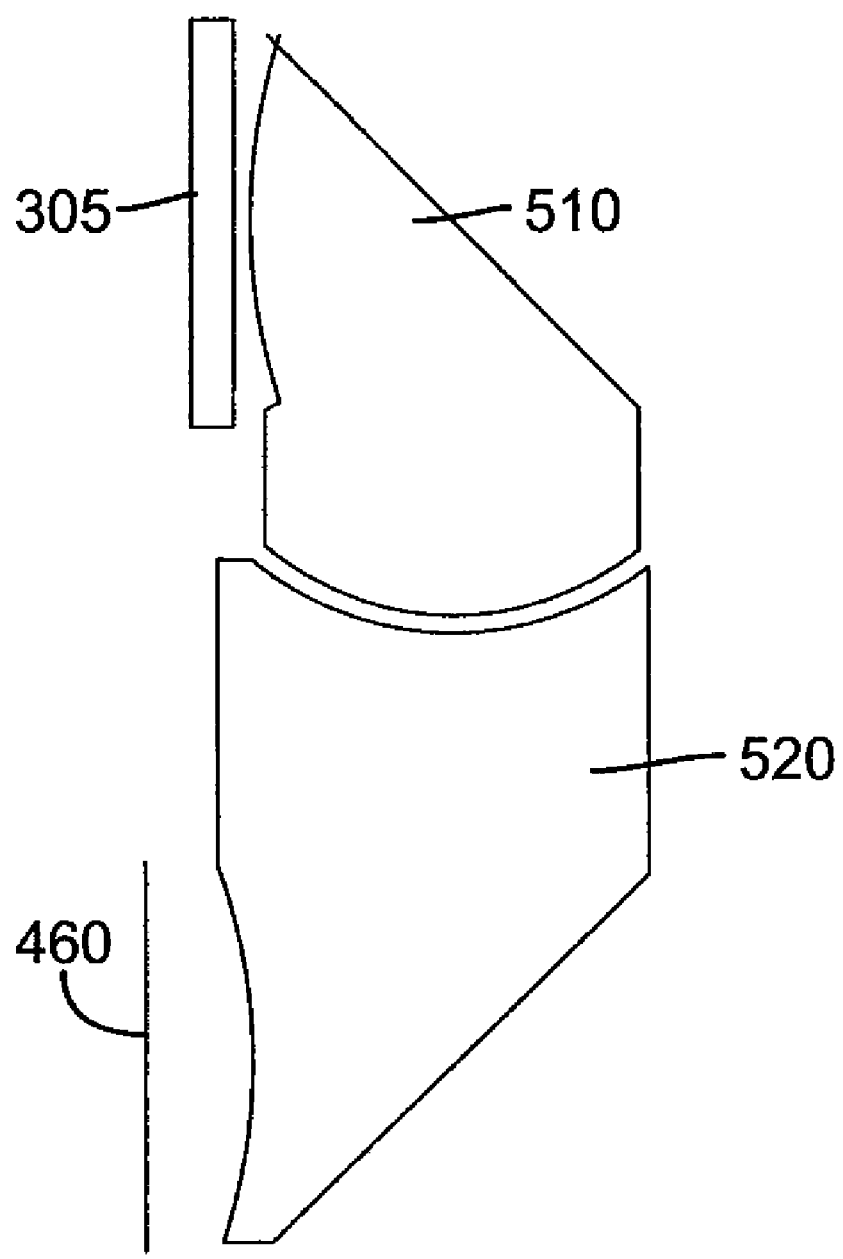
FIG. 5 is a schematic cross section of the elements for the U-shaped layout folded lens from FIG. 4.

Both the Z-shaped layout and the U-shaped layout can be applied to fixed focal length lenses or adjustable focal length (zoom) lenses to reduce the thickness of the lens assembly. For the case of the adjustable focal length lens, the two elements 510 and 520 move relative to one another (in a vertical direction as shown in FIG. 5) for zooming. A moderate zoom ratio is attainable with this approach.

To further reduce the cost of the lens assembly and reduce the volume of the lens, the invention is directed to fixed focal length lens designs. A combination of two fixed focal length lenses as described by the invention, a wide angle lens (or moderate angle lens) and a telephoto lens, can be used together in an image module to provide a zoom action with composite imaging. The technique of composite imaging to achieve a zoom action with composite imaging is disclosed in commonly-assigned copending U.S. patent application Ser. No. 11/461,574, filed Aug. 1, 2006.

An exemplary embodiment of the invention for a compact fixed focal length lens with a moderate angle field of view in a U-shaped layout is shown in FIG. 4. (For comparison, a similar lens design with a Z-shaped layout is shown in FIG. 3.) This design includes two prism type elements 510 and 520 with power on one or more refractive surfaces each to produce a very small and thin form factor. In addition, the U-shaped layout keeps the image sensor 460 in an orientation such that the image sensor does not add substantially to the thickness of the lens assembly or the image module that would be produced with the lens assembly. The lens design of the invention also provides space on either side of the image sensor 460 (above and below the image sensor 460 as shown in FIG. 4) that can be occupied by the capacitors and other circuitry associated with the image sensor 460 without adding to the thickness of the lens assembly or image module. The thicknesses of the two lens assemblies are indicated in FIGS. 3 and 4 wherein the thickness dimension t is shown as being the distance from the front vertex of the lens to the face of the image sensor. A cross-sectional view of the two lens elements 510 and 520 for the U-shaped layout is shown in FIG. 5 along with the cover glass 350 and the image sensor 460.

Figure 7:
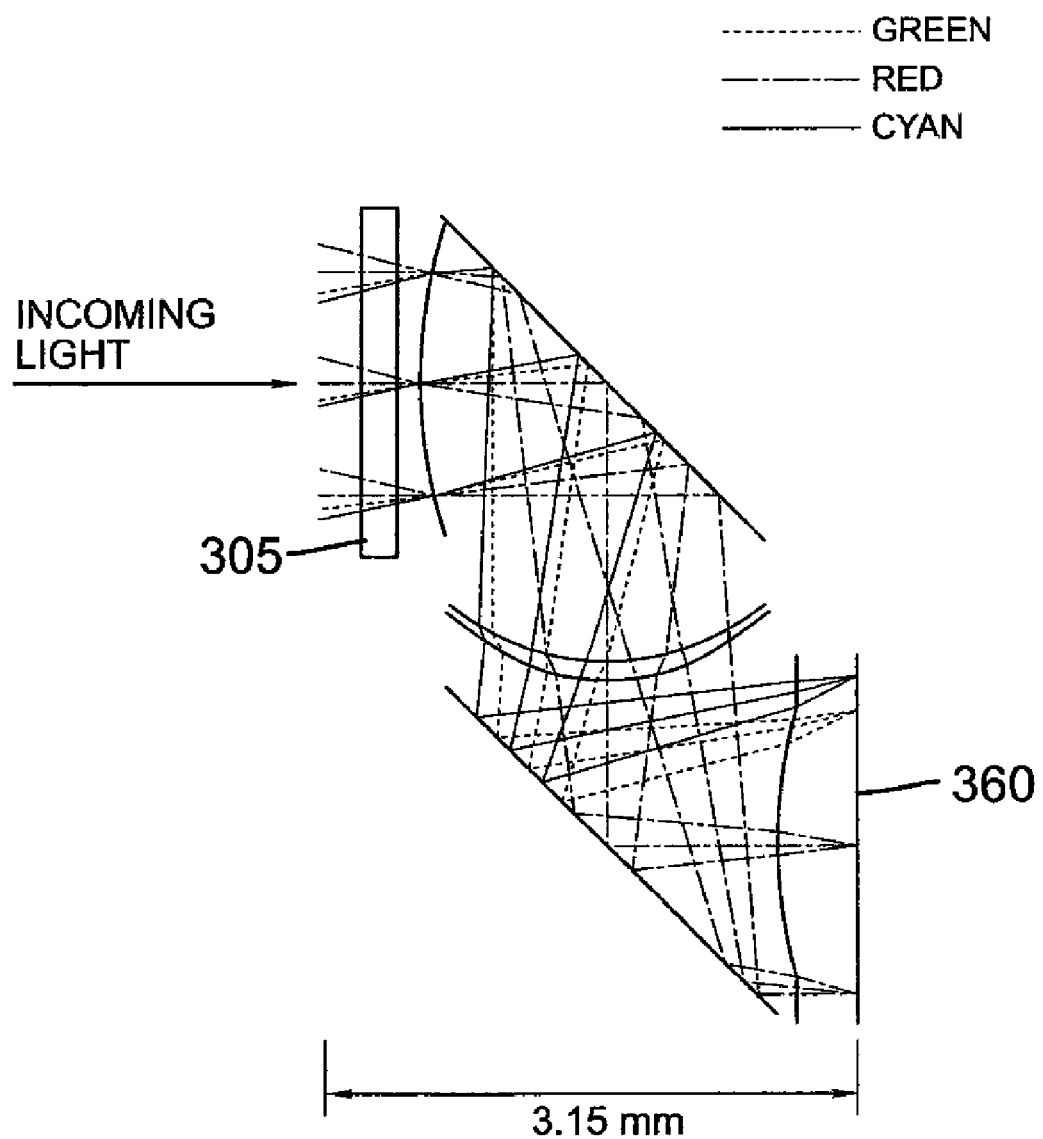
FIG. 7 is a ray trace schematic of a wider angle field of view lens (50 mm EFL) in a Z-shaped layout.
Figure 8:
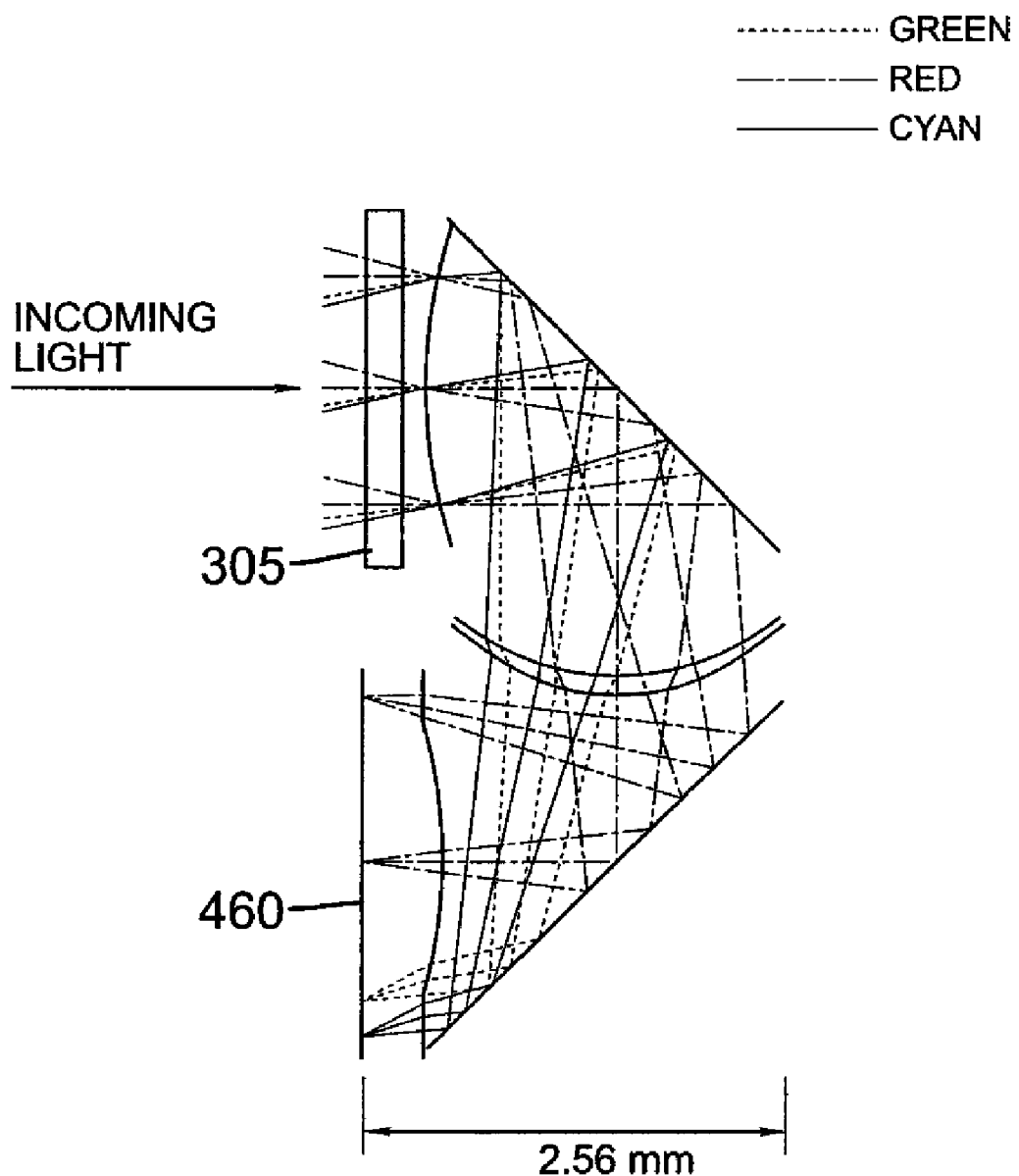
FIG. 8 is a ray trace schematic of a wider angle field of view lens (50 mm EFL) in a U-shaped layout.
Figure 9:
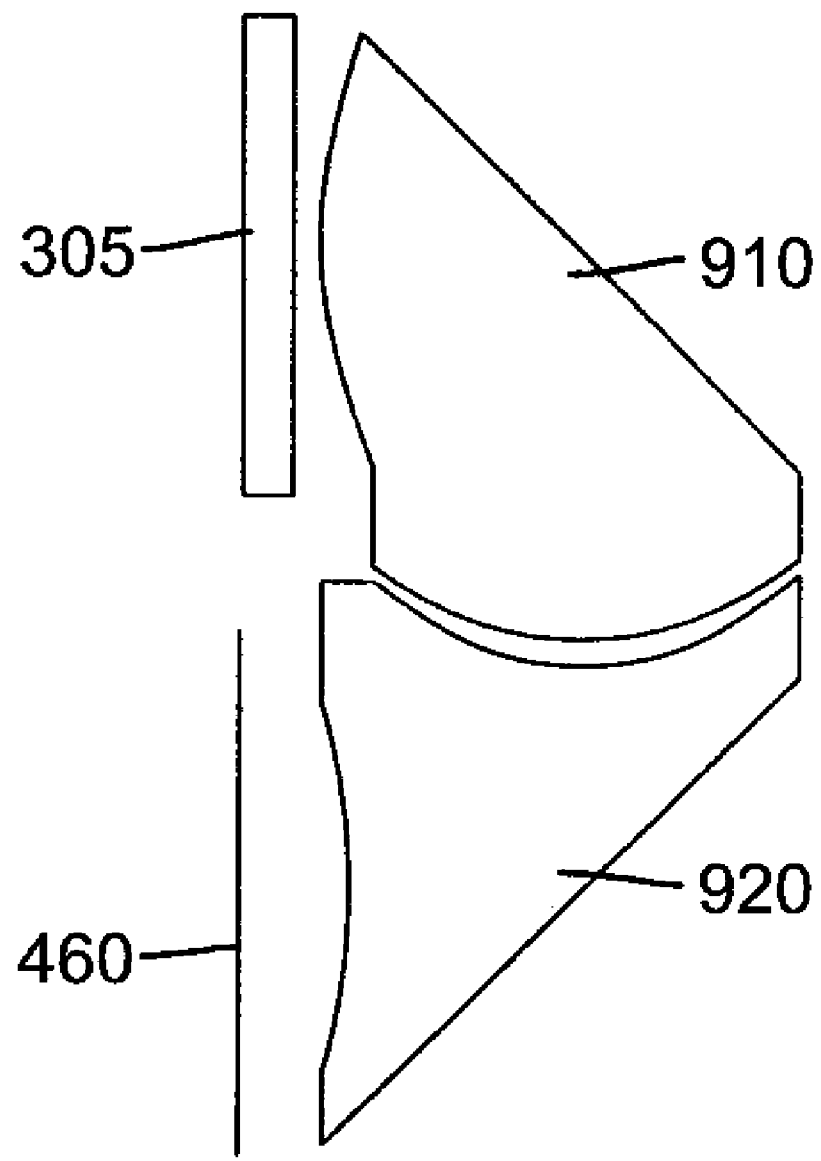
FIG. 9 is a schematic cross section of the elements for the U-shaped layout folded lens shown in FIG. 8.
Figure 11:
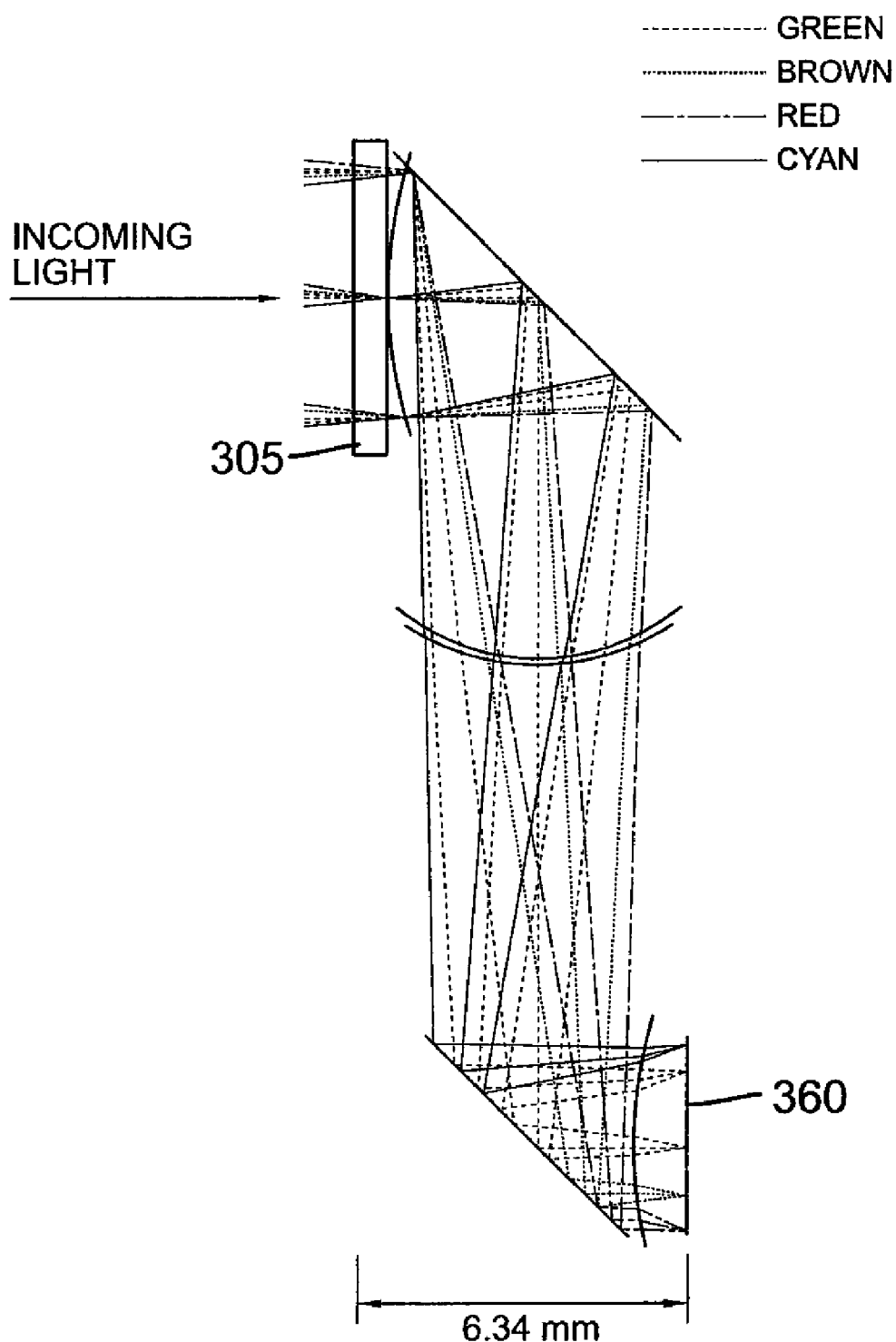
FIG. 11 is a ray trace schematic of a telephoto (107 mm EFL) in a Z-shaped layout.
Figure 12:
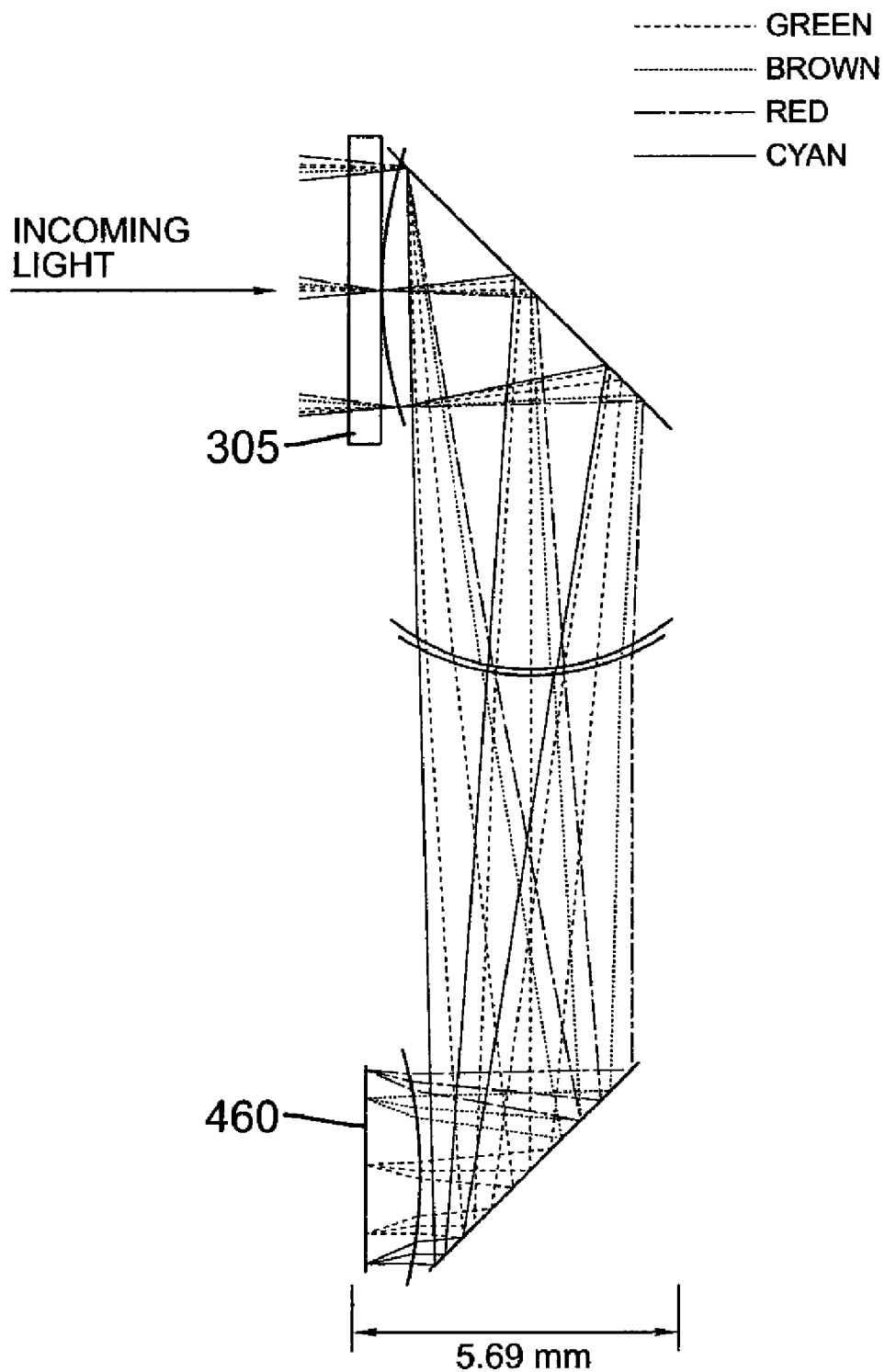
FIG. 12 is a ray trace schematic of a telephoto lens (107 mm EFL) in a U-shaped layout.
Figure 13:
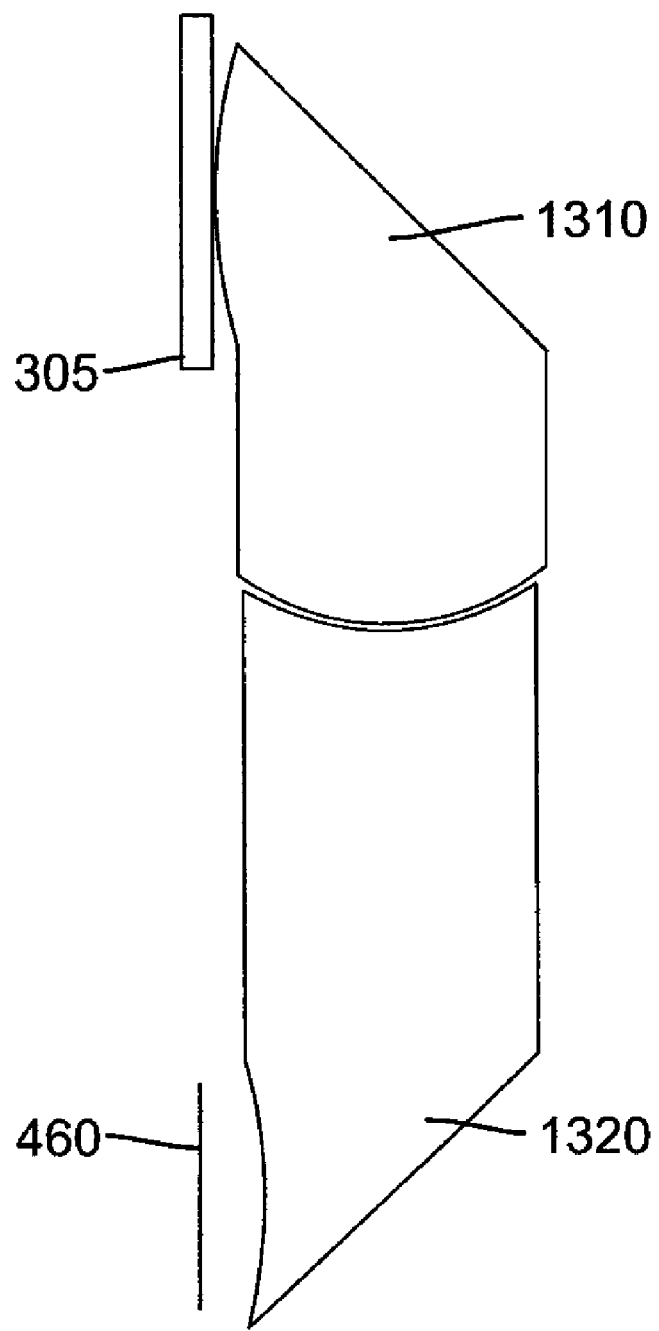
FIG. 13 is a schematic cross section of the elements for the U-shaped layout lens shown in FIG. 12.

Table 1, below, shows the thickness benefit provided by the U-shaped layout as disclosed as the invention as compared to a Z-shaped layout for the moderate angle field of view lens discussed above along with thickness data for a wider angle field of view lens and a telephoto angle field of view lens. The ray trace schematics and cross sectional schematics for the wider angle field of view lens in both a Z-shaped layout and a U-shaped layout are shown in FIGS. 7, 8 and 9 while the ray trace schematics and cross sectional schematics for the telephoto angle field of view lens in both a Z-shaped layout and a U-shaped layout are shown in FIGS. 11, 12 and 13.

TABLE 1

Thickness comparison of different lens designs

| Lens type | Lens layout | Thickness (mm) |
|---|---|---|
| Moderate angle | Z | 3.84 |
| Moderate angle | U | 3.28 |
| Wider angle | Z | 3.15 |

TABLE 1-continued

Thickness comparison of different lens designs

| Lens type | Lens layout | Thickness (mm) |
|---|---|---|
| Wider angle | U | 2.56 |
| Telephoto | Z | 6.34 |
| Telephoto | U | 5.69 |

Figure 6:
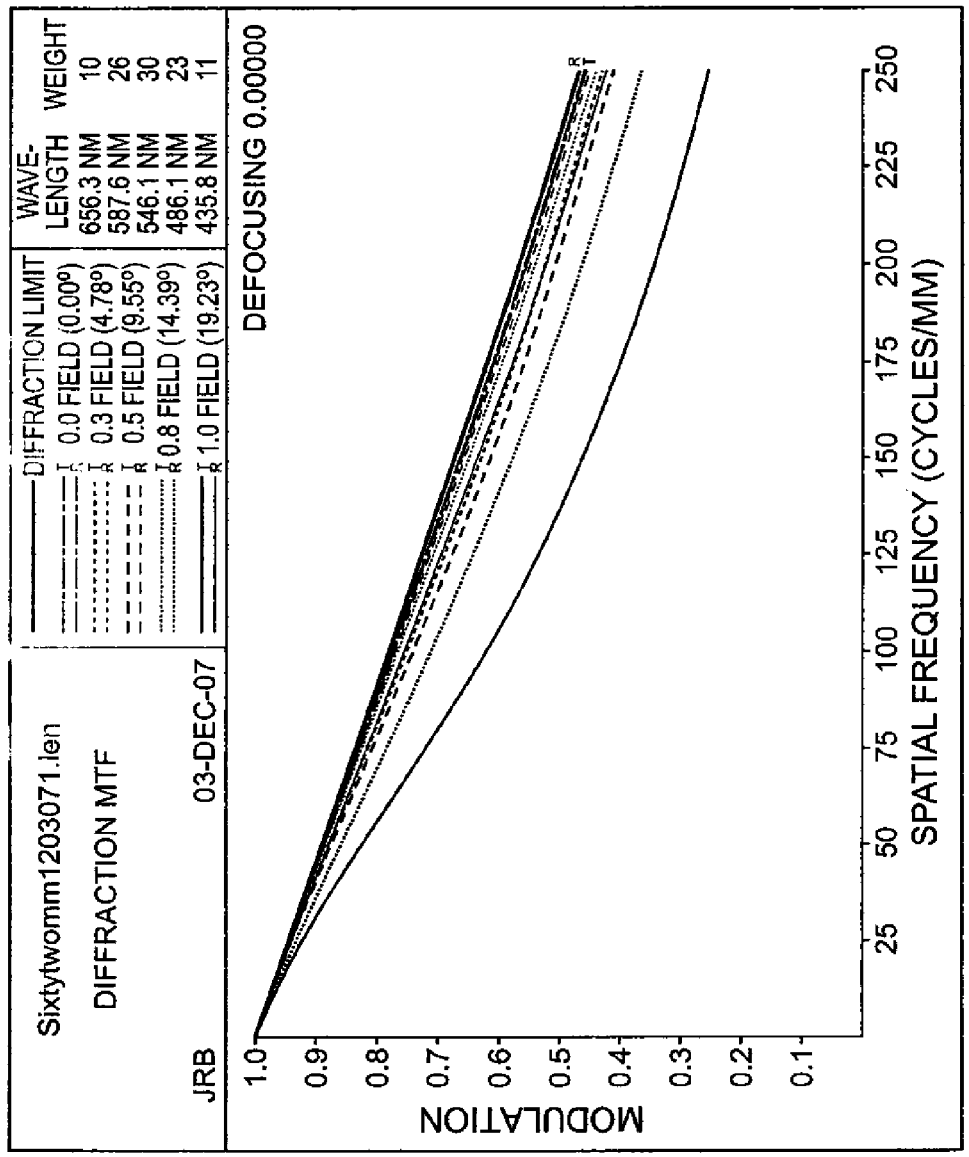
FIG. 6 is a modulation transfer function (MTF) chart for the lens shown in FIGS. 4 and 5.
Figure 10:
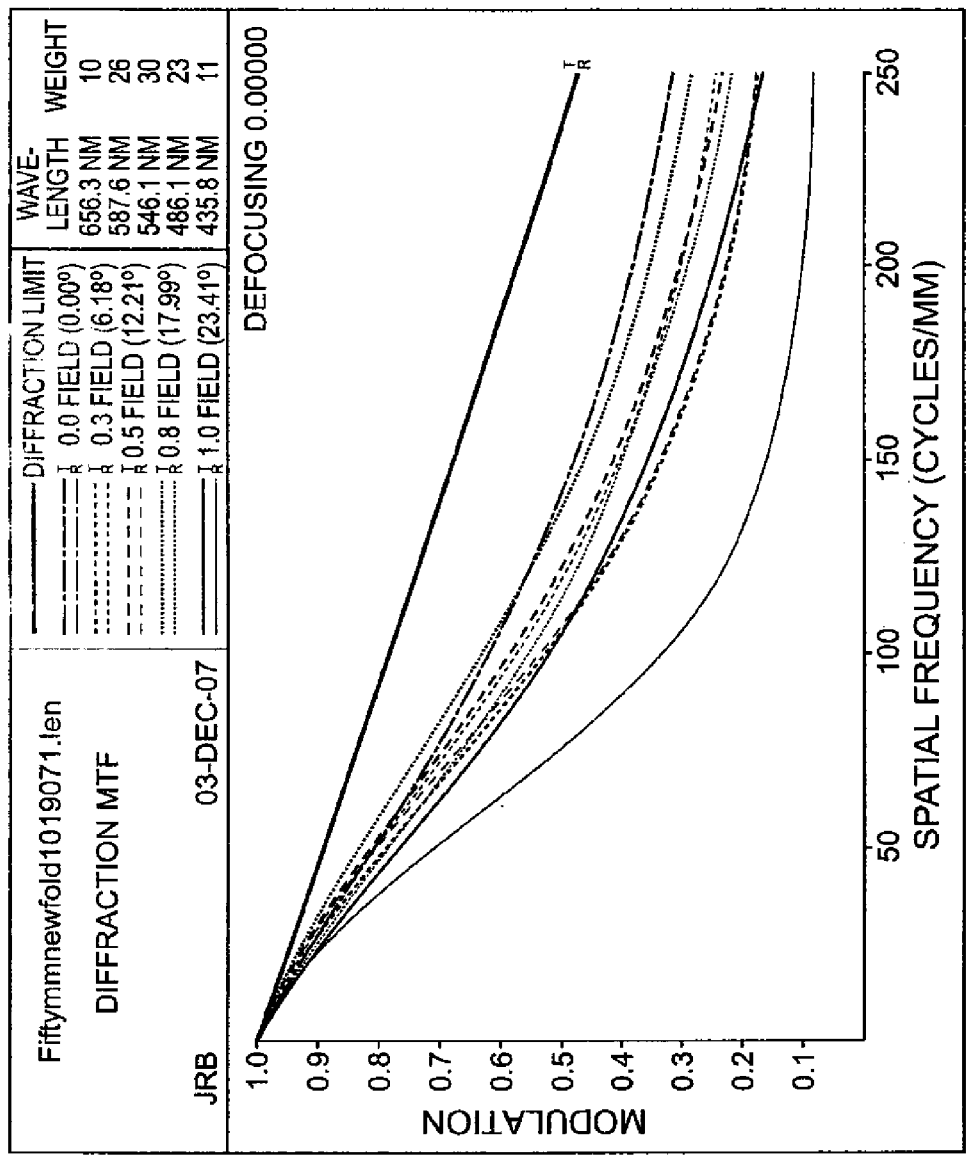
FIG. 10 is a MTF chart for the lens shown in FIGS. 8 and 9.
Figure 14:
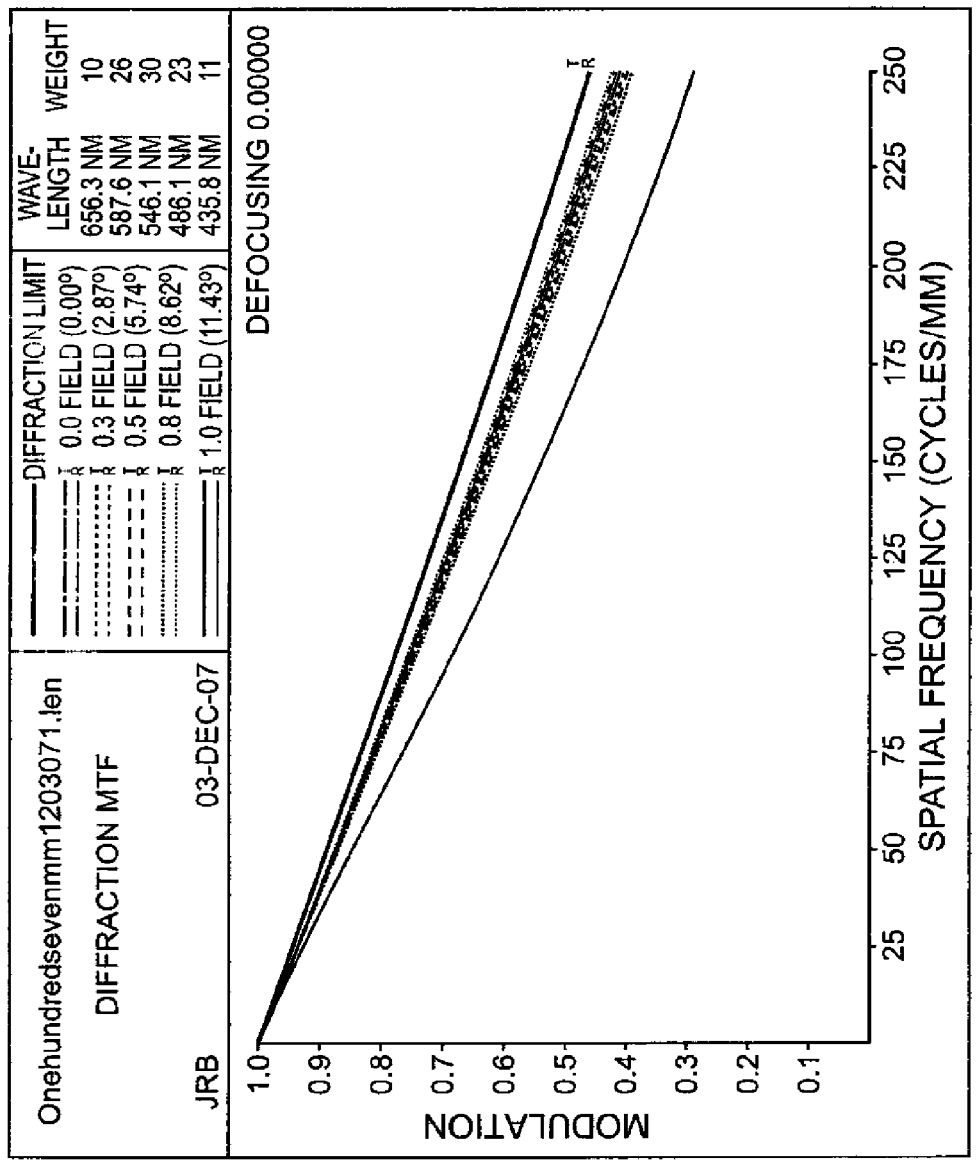
FIG. 14 is a MTF chart for the lens shown in FIGS. 12 and 13.

The modulation transfer function chart for the moderate angle field of view lens is shown in FIG. 6. The modulation transfer function provided by the two element folded lens design is quite good out beyond 250 line pairs/mm. Which corresponds to the Nyquist frequency for an image sensor with 0.002 mm sized pixels. Wherein, the Nyquist frequency is the highest frequency that the sensor can reliably detect and is defined as $$N = 1/(2p)$$

Wherein N is the Nyquist frequency expressed in line pairs/mm and p is the pixel size in mm. The Nyquist charts for the wider angle field of view lens and the telephoto angle field of view lens are shown in FIGS. 10 and 14 respectively.

There are two types of aberrations that need to be controlled in a lens system; the monochromatic and the color aberrations. Monochromatic aberrations are generally controlled by lens shape and aspheric surfaces can aid greatly in their control. Color aberrations are more typically controlled by the choice of materials used in the optical elements. For compact systems, the fewest number of elements is the most desirable. However, to control color, at least two different optical materials must be used. Consequently, a two element lens is the minimum possible configuration for a color corrected refractive lens system. The invention includes two elements (510 and 520) that can be different materials to enable color correction and four surfaces (400, 420, 430, 450) that can be aspheric shape if needed to correct for monochromatic aberrations.

Figure 15:
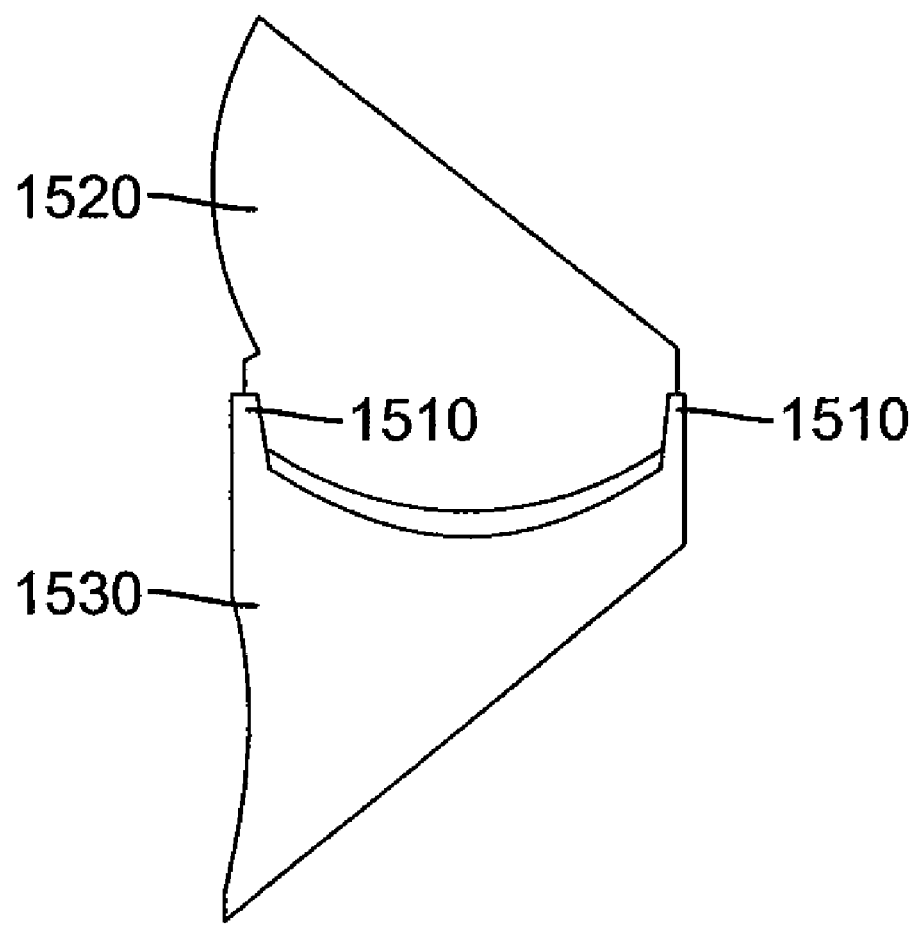
FIG. 15 is schematic cross section of molded-in alignment features at the interface between the two elements for the lens shown in FIGS. 8 and 9.

Because the invention describes two element lenses that are very small in size, very tight alignment tolerances of the elements with respect to one another are typically required to deliver good modulation transfer function performance. To this end, the invention includes molded-in alignment features 1510 in the plastic elements 1520 and 1530, at the interface between the two elements, that force the elements 1520 and 1530 into alignment with one another when they are assembled. Preferably, the alignment features 1510 are rotationally symmetric so they can be machined along with the optical surfaces. Also the guiding surfaces on the alignment features 1510 are preferably angled or tapered to allow the surfaces of the alignment features 1510 to come together easily at first and then get progressively tighter as the elements 1520 and 1530 are moved together into position. FIG. 15 shows a set of alignment features 1510 associated with the two elements 1520 and 1530 of one of the lens designs discussed previously.

In addition to alignment features, other mounting features can also be molded into the two elements. These features can be associated with mounting the lens into the portable device structure or as guidance of the lens during movement for autofocus.

Example 1

Ray trace schematics for a lens with moderate angle field of view designed as an example of the invention is shown in a Z-shaped layout in FIG. 3 and a U-shaped layout in FIG. 4. The optical performance and the optical surfaces are the same for both the Z-shaped layout and the U-shaped layout. A description of the lens design including surface curvatures, lateral distances, aperture sizes and materials is given in Table 2 below. The lens is designed for an f# of 3.2, a pixel size of 0.002 mm and a sensor with two mega pixels. The modulation transfer function chart is shown in FIG. 6. The difference between the Z-shaped layout and the U-shaped layout versions of the lens are in the thickness dimension of the lens assembly, as can be seen in Table 1 and in FIGS. 3 and 4, the Z-shaped layout lens is 3.84 mm thick while the U-shaped layout lens is only 3.28 mm thick. For clarification, a cross sectional schematic of the U-shaped layout lens assembly with elements 510 and 520 along with cover glass 305 and image sensor 460 is shown in FIG. 5. Based on the sensor size and the thickness, this design is well suited to use in a cell phone or a laptop computer or other application where thinness and moderate angle field of view is important.

TABLE 2

Lens description for Example 1 with a 62 mm focal length

| Element # | Surface # | Radius | Shape | Thickness or Separation | Aperature Dimension | Aperture Shape | Material |
|---|---|---|---|---|---|---|---|
| 1 | 1 | Infinite | Flat | 0.3000 | 2.041 | Circular | NBK7 Schott |
| 1 | 2 | Infinite | Flat | 0.1000 | 1.931 | Circular | |
| 2 | 3 | 3.542 | Asphere 1 | 1.3000 | 1.875 | Circular | Zeonex-E48R |
| 2 | 4 | Infinite | Flat | −2.5667 | 3.035 | Circular | Reflective |
| 2 | 5 | 1.834 | Asphere 2 | −0.1000 | 2.574 | Circular | |
| 3 | 6 | 2.369 | Asphere 3 | −2.7595 | 2.467 | Circular | Polycarbonate |
| 3 | 7 | Infinite | Flat | 1.3300 | 4.166 | Circular | Reflective |
| 3 | 8 | 3.642 | Asphere 4 | 0.6667 | 3.709 | Circular | |
| Image | | Infinite | Flat | | 4.002 | | |

Aspheric Constants $$Z = (VY^2/SQRT(1 + (1 - (1 + K)(C^2 Y^2)))) + AY^4 + BY^6 + CY^8 + DY^{10}$$

| Asphere # | V | K | A | B | C | D |
|---|---|---|---|---|---|---|
| Asphere 1 | 2.8240E−01 | 0.0000E+00 | −3.0971E−03 | −8.3905E−04 | 5.6459E−04 | −6.3323E−04 |
| Asphere 2 | 5.4520E−01 | 0.0000E+00 | 6.6605E−03 | −1.9118E−02 | 5.4267E−03 | −1.2105E−03 |
| Asphere 3 | 4.2210E−01 | 0.0000E+00 | 3.6153E−02 | −1.7355E−02 | 5.9225E−03 | −1.0372E−03 |
| Asphere 4 | 2.7460E−01 | 0.0000E+00 | −1.3189E−02 | −1.3661E−03 | 5.9801E−04 | −4.8621E−05 |

Example 2

Ray trace schematics for a lens with a wider angle field of view designed as an example of the invention is shown in a Z-shaped layout in FIG. 7 and a U-shaped layout in FIG. 8. As in the lenses in Example 1, the optical performance and the optical surfaces are the same for both the Z-shaped layout and the U-shaped layout. A description of the lens design including surface curvatures, lateral distances, aperture sizes and materials is given in Table 3 below. The lens is designed for an f# of 3.2, a pixel size of 0.002 mm and a sensor with two mega pixels. The modulation transfer function chart is shown in FIG. 10. The difference between the Z-shaped layout and the U-shaped layout versions of the lens are in the thickness dimension of the lens assembly, as can be seen in Table 1 and in FIGS. 7 and 8, the Z-shaped layout lens is 3.15 mm thick while the U-shaped layout lens is only 2.56 mm thick. For clarification, a cross sectional schematic of the U-shaped layout lens assembly with elements 910 and 920 along with cover glass 305 and image sensor 460 is shown in FIG. 9. Based on the sensor size and the thickness, this design is well suited to use in a cell phone or a laptop computer or other application where thinness and a wider angle field of view is important.

TABLE 3

Lens description for Example 2 with a 62 mm focal length

| Element # | Surface # | Radius | Shape | Thickness or Separation | Aperature Dimension | Aperture Shape | Material |
|---|---|---|---|---|---|---|---|
| 1 | 1 | Infinite | Flat | 0.3000 | 1.732 | Circular | NBK7 Schott |
| 1 | 2 | Infinite | Flat | 0.1000 | 1.596 | Circular | |
| 2 | 3 | 2.182 | Asphere 1 | 1.2000 | 1.444 | Circular | Zeonex-E48R |
| 2 | 4 | Infinite | Flat | −1.8700 | 2.339 | Circular | Reflective |
| 2 | 5 | 1.270 | Asphere 2 | −0.1728 | 2.015 | Circular | |
| 3 | 6 | 1.164 | Asphere 3 | −1.0500 | 1.941 | Circular | Polycarbonate |
| 3 | 7 | Infinite | Flat | 1.0500 | 3.880 | Circular | Reflective |
| 3 | 8 | 2.837 | Asphere 4 | 0.5000 | 3.311 | Circular | |
| Image | | Infinite | Flat | | 3.496 | | |

Aspheric Constants $$Z = (VY^2/SQRT(1 + (1 − (1 + K)(C^2Y^2)))) + AY^4 + BY^6 + CY^8 + DY^{10}$$

| Asphere # | V | K | A | B | C | D |
|---|---|---|---|---|---|---|
| Asphere 1 | 4.5820E−01 | 0.0000E+00 | −5.6310E−03 | −2.5584E−03 | 1.9920E−03 | −6.4583E−03 |
| Asphere 2 | 7.8720E−01 | 0.0000E+00 | 2.3760E−02 | −2.1772E−02 | 1.9544E−01 | −7.2848E−02 |
| Asphere 3 | 8.5920E−01 | 0.0000E+00 | 1.4551E−01 | −4.4757E−01 | 4.4868E−01 | −1.8946E−01 |
| Asphere 4 | 3.5250E−01 | 0.0000E+00 | −1.3026E−01 | 4.6514E−02 | −1.3216E−02 | 1.4327E−03 |

Example 3

Lenses with a telephoto angle field of view lens and a larger image sensor were designed as yet a further example of the invention. Ray trace schematics for a telephoto lens designed as an example of the invention are shown in a Z-shaped layout in FIG. 11 and a U-shaped layout in FIG. 12. As in the lenses in Examples 1 and 2, the optical performance and the optical surfaces are the same for both the Z-shaped layout and the U-shaped layout. A description of the lens design including surface curvatures, lateral distances, aperture sizes and materials is given in Table 4 below. In this case, the lens is designed for an f# of 3.2, a pixel size of 0.003 mm and a sensor with two mega pixels. The modulation transfer function chart is shown in FIG. 14. The difference between the Z-shaped layout and the U-shaped layout versions of the lens are in the thickness dimension of the lens assembly, as can be seen in Table 1 and in FIGS. 11 and 12, the Z-shaped layout lens is 6.34 mm thick while the U-shaped layout lens is only 5.69 mm thick. For clarification, a cross sectional schematic of the U-shaped layout lens assembly is shown with elements 1310 and 1320 along with cover glass 305 and image sensor 460 in FIG. 13. Based on the sensor size and the thickness, this design is also well suited to use in a cell phone or a laptop computer or other application where thinness and a telephoto angle field of view is important.

structural element or to aid in alignment with the image sensor or an autofocus element.

The invention has been described in detail with particular reference to certain preferred embodiments thereof, but it will be understood that variations and modifications can be effected within the scope of the invention.

PARTS LIST

| | |
|---|---|
| 100 | refractive surface |
| 110 | reflective surface |
| 120 | refractive surface |
| 130 | refractive surface |
| 140 | reflective surface |
| 150 | reflective surface |
| 160 | refractive surface |
| 170 | infrared filter and cover glass for sensor |
| 180 | image sensor |
| 210 | prism element |
| 230 | refractive element |
| 240 | refractive element |
| 250 | refractive element |
| 255 | refractive element |
| 260 | refractive element |
| 270 | prism element |
| 275 | infrared filter and cover glass for sensor |
| 285 | image sensor |
| 305 | cover glass |
| 310 | reflective surface S2 for moderate angle |

TABLE 4

Lens description for Example 3 with a 107 mm focal length

| Element # | Surface # | Radius | Shape | Thickness or Separation | Aperature Dimension | Aperture Shape | Material |
|---|---|---|---|---|---|---|---|
| 1 | 1 | Infinite | Flat | 0.3000 | 4.784 | Circular | NBK7 Schott |
| 1 | 2 | Infinite | Flat | 0.1000 | 4.72 | Circular | |
| 2 | 3 | 8.008 | Asphere 1 | 2.7500 | 4.688 | Circular | Zeonex-E48R |
| 2 | 4 | Infinite | Flat | −7.0040 | 6.754 | Circular | Reflective |
| 2 | 5 | 4.273 | Asphere 2 | −0.1000 | 4.905 | Circular | |
| 3 | 6 | 4.93 | Asphere 3 | −9.0612 | 4.767 | Circular | Polycarbonate |
| 3 | 7 | Infinite | Flat | 2.0000 | 6.51 | Circular | Reflective |
| 3 | 8 | 8.628 | Asphere 4 | 1.0000 | 5.622 | Circular | |
| Image | | Infinite | Flat | | 6.001 | | |

Aspheric Constants
$$Z = (VY^2/\text{SQRT}(1 + (1 - (1 + K)(C^2 Y^2)))) + AY^4 + BY^6 + CY^8 + DY^{10}$$

| Asphere # | V | K | A | B | C | D |
|---|---|---|---|---|---|---|
| Asphere 1 | 1.2490E−01 | 0.0000E+00 | −1.1073E−04 | −5.7443E−06 | 5.8261E−07 | −7.2893E−08 |
| Asphere 2 | 2.3410E−01 | 0.0000E+00 | −3.5903E−04 | −2.7866E−04 | 2.7053E−05 | −1.5048E−06 |
| Asphere 3 | 2.0290E−01 | 0.0000E+00 | 1.2061E−03 | −2.4682E−04 | 2.7606E−05 | −1.4681E−06 |
| Asphere 4 | 1.1590E−01 | 0.0000E+00 | −6.5592E−04 | 1.1303E−04 | −2.3992E−05 | 2.3945E−06 |

Example 4

The lens described in Example 2 is modified as shown in FIG. 15 to include alignment features 1510. In this case, alignment features 1510 guide the two lens elements 1520 and 1530 into a position during assembly wherein the refractive and reflective surfaces are aligned relative to one another. In a preferred embodiment, the alignment features are manufactured at the same time as the refractive and reflective surfaces to improve the accuracy of the relative alignment. The lens elements 1510 and 1520 are then molded to produce the refractive and reflective surfaces along with the alignment features. Other alignment features can likewise be manufactured within the scope of the invention along with the refractive and reflective surfaces to aid in aligning the lens into a

PARTS LIST-continued

| | |
|---|---|
| | lens design with Z-shaped layout |
| 340 | reflective surface S5 for moderate angle lens design with Z-shaped layout |
| 355 | optical axis |
| 360 | image sensor |
| 400 | refractive surface |
| 410 | reflective surface |
| 420 | refractive surface |
| 430 | refractive surface |
| 440 | reflective surface |
| 450 | refractive surface |
| 455 | optical axis perpendicular to image sensor |
| 460 | image sensor |
| 510 | first element |
| 520 | second element |

PARTS LIST-continued

| 910 | element |
| 920 | element |
| 1310 | element |
| 1320 | element |
| 1510 | alignment features |
| 1520 | element |
| 1530 | element |

The invention claimed is:

1. A thin lens comprising:
a first optical element comprising:
a first refracting surface, wherein incoming light passes through the first refracting surface on a first optical axis;
a reflecting surface for changing a direction of the incoming light from the first optical axis to a second optical axis;
a second refracting surface, wherein the incoming light on the second optical axis passes through the second refracting surface;
a second optical element comprising:
a first refracting surface, wherein incoming light passes through the first refracting surface on the second optical axis;
a reflecting surface for changing a direction of the incoming light from the second optical axis to a third optical axis;
a second refracting surface, wherein the incoming light on the third optical axis passes through the second refracting surface;
the third optical axis is approximately parallel to and in an opposite direction from the first optical axis;
the first optical element and the second optical element are solid optical material; and
wherein the first optical element has positive optical power and a first dispersion, and the second optical element has a negative optical power and a second dispersion.

2. The thin lens according to claim 1 wherein the thin lens is a fixed focal length lens.

3. The thin lens according to claim 1 wherein the first optical element and the second optical element have alignment features.

4. The thin lens according to claim 1 wherein the second dispersion is higher than the first dispersion.

5. The thin lens according to claim 1 wherein:
the first optical element has an aperture parallel to the first refracting surface;
an image sensor adjacent to the second refracting surface of the second optical element; and
wherein a plate formed by the image sensor is parallel to a plane formed by the aperture.

6. The thin lens according to claim 1 wherein the first and second surfaces of both optical elements are rotationally symmetric and the reflective surfaces are planar.

7. An image capture apparatus comprising:
a first optical element comprising:
a first refracting surface, wherein incoming light passes through the first refracting surface on a first optical axis;
a reflecting surface for changing a direction of the incoming light from the first optical axis to a second optical axis;
a second refracting surface, wherein the incoming light on the second optical axis passes through the second refracting surface;
a second optical element comprising:
a first refracting surface, wherein incoming light passes through the first refracting surface on a second optical axis;
a reflecting surface for changing a direction of the incoming light from the second optical axis to a third optical axis;
a second refracting surface, wherein the incoming light on the third optical axis passes through the second refracting surface;
an image sensor adjacent to the second refracting surface of the second optical element;
wherein the third optical axis is approximately parallel to and in an opposite direction from the first optical axis; and
wherein the image sensor is parallel to a plane formed by an aperture of the first refracting surface of the first optical element.

8. A thin lens comprising:
a first optical element having a positive optical power comprising:
wherein incoming light is redirected to a second optical axis approximately 90 degrees to the first optical axis; and
a second optical element having a negative optical power comprising:
wherein incoming light on the second optical axis is redirected to a third optical axis approximately 90 degrees to the second optical axis and parallel to and in opposite direction from incoming light on the first optical axis;
the first optical element has an aperture parallel to a first refracting surface;
an image sensor adjacent to a refracting surface of the second optical element; and
wherein a plate formed by the image sensor is substantially parallel to a plane formed by the aperture.

* * * * *